United States Patent [19]
Fowlow et al.

[11] Patent Number: 5,949,998
[45] Date of Patent: Sep. 7, 1999

[54] FILTERING AN OBJECT INTERFACE DEFINITION TO DETERMINE SERVICES NEEDED AND PROVIDED

[75] Inventors: Brad G. Fowlow, Redwood City; Gregory B. Nuyens, Menlo Park; Hans E. Muller, Saratoga, all of Calif.

[73] Assignee: Sun Microsystems, Inc., Palo Alto, Calif.

[21] Appl. No.: 08/675,094

[22] Filed: Jul. 3, 1996

[51] Int. Cl.⁶ .................................................. G06F 17/24
[52] U.S. Cl. ........................ 395/701; 395/680; 395/683; 707/103
[58] Field of Search ................................. 395/707–703, 395/680, 683, 200.33, 200.47, 49; 345/967; 707/102–104, 1

[56] References Cited

U.S. PATENT DOCUMENTS

| | | | |
|---|---|---|---|
| 5,261,098 | 11/1993 | Katin et al. | 707/1 |
| 5,339,419 | 8/1994 | Chan et al. | 395/700 |
| 5,339,433 | 8/1994 | Frid-Nielsen | 395/700 |
| 5,392,448 | 2/1995 | Frankel et al. | 395/800 |
| 5,414,806 | 5/1995 | Richards | 395/135 |
| 5,446,902 | 8/1995 | Islam | 395/703 |
| 5,450,583 | 9/1995 | Inada | 395/650 |
| 5,475,817 | 12/1995 | Waldo et al. | 395/650 |
| 5,524,246 | 6/1996 | Hurley et al. | 395/683 |
| 5,659,735 | 8/1997 | Parrish et al. | 395/610 |
| 5,671,415 | 9/1997 | Hossian | 395/701 |
| 5,692,183 | 11/1997 | Hapner et al. | 395/701 |
| 5,699,310 | 12/1997 | Garloff et al. | 395/701 |
| 5,721,911 | 2/1998 | Ha et al. | 395/611 |
| 5,724,589 | 3/1998 | Wold | 395/701 |

OTHER PUBLICATIONS

Cobra Specification, Revision 2.0, Jul. 1995. Object Management Group, Inc., entire document Jul. 1995.

Al–Salquant et al., Media Wave: A Distributed Multimedia Environment with Interopenability, Enabling Technologies, 1995 Workshop, pp. 128–137 Apr. 1995.

Gamma et al., Factory Method Design Patterns–Elements of Reusable Object—Oriented Software, pp. 107–116 Dec. 1994.

*Primary Examiner*—Hal Dodge Wachsman
*Attorney, Agent, or Firm*—Beyer & Weaver, LLP

[57] ABSTRACT

A distributed object application builder apparatus filters an object definition to determine both information needed (plugs) and provided (sockets) by an object. Each part (a run-time instance of an object) in the builder has plugs and sockets interconnected to other parts to define a distributed object application program. At run time, actual instances of objects are substituted for the parts. A method of determining the plugs of an identified part retrieves the interface (object definition) corresponding to the part. Once retrieved, the plugs of the part are identified by determining the object-valued attributes of the retrieved interface, by determining the operations from the retrieved interface that require one object-valued argument, and by retrieving the factory argument list from the factory method for the object. These attributes and arguments constitute the plugs of the part. Sockets of a part are determined similarly. The plugs of a part are determined based upon their matching with a previously chosen socket. Similarly, if a plug is chosen first from a part, this chosen plug is matched with a socket of another part. A distributed object application program is constructed by choosing a first part, filtering its interface to determine its plugs and sockets, and then choosing and filtering the interface of a second part. Once plugs and sockets have been determined, they are connected to at least partially define a distributed object application program. The filtering takes place within a visual application builder using a graphical user interface to select and connect parts.

35 Claims, 11 Drawing Sheets

FILTERING AN OBJECT INTERFACE DEFINITION TO DETERMINE SERVICES NEEDED AND PROVIDED

CROSS REFERENCE TO RELATED APPLICATIONS

The following U.S. patent applications, all filed concurrently herewith, are related to the present application and are incorporated by reference herein in their entirety: U.S. patent application Ser. No. 08/675,563 (pending); U.S. patent application Ser. No. 08/675,850 (pending); and U.S. patent application Ser. No. 08/674,828 now issued as U.S. Pat. No. 5,860,004.

FIELD OF THE INVENTION

The present invention relates generally to the development of an object-oriented application program within a computer system. More specifically, the present invention relates to processing and filtering the features of an object interface to facilitate the development of an object-oriented application program within a distributed object system.

BACKGROUND OF THE INVENTION

With the increasing popularity and importance of object-oriented systems and applications, it has become critical to be able to develop applications in an efficient and reliable manner. Especially within the context of a distributed object system where objects may be more complex and may reside in remote locations, it can be very time consuming for an application developer not only to write the code to implement a local object, but also to locate a remote object and determine what information he or she either needs from the remote object or must provide to the remote object. In general, traditional notions of efficient coding and reuse of software code are equally applicable in regard to the development of application programs for distributed object systems.

Due to the very nature of object-oriented programming within a distributed object system, an application developer is constantly defining new objects, calling and invoking methods on already existing remote objects or receiving information from a remote object for use by previously defined local objects. Accordingly, techniques that would allow an application developer to reuse existing objects in the formation of new objects and implementations would save the developer from having to write these objects from scratch. Also, an apparatus that would allow an application developer to be able to locate objects in a distributed environment to be used within a new application program would be helpful. However, once an existing object has been located within a distributed object environment and has been identified for reuse, it is important to be able to determine what services the object provides and what services it requires in order to connect this object to other objects so as to form a new implementation. In other words, the services that one object provides may be used by another object. But first, the services that an object provides and requires must be determined so that a developer is able to make intelligent choices about how an object may be connected to other objects.

Accordingly, it would be desirable to have a technique and apparatus for determining what services are needed by an object and what services are provided by an object. Furthermore, it would be desirable to be able to filter the definition of an object in the context of a visual tool such that this information may be displayed visually to the user. Additionally, it would be desirable for such a technique to be able to assist in making the connections between objects such that services may be made available to objects requiring them.

SUMMARY OF THE INVENTION

In one aspect of the present invention, the filtering technique takes place within a distributed object application builder apparatus. Each part (representing a run-time instance of an object) in the builder has plugs and sockets that are interconnected to other parts in order to define distributed object application programs. Each part corresponds to a component, which in turn, represents a distributed object. One method of determining the plugs of an identified part includes the step of retrieving the interface for the component that corresponds to the part. Once this interface has been retrieved, the plugs of the part may be identified. The plugs are identified by determining attributes from the retrieved interface, by determining operations from the retrieved interface that require one operation argument, and by retrieving the factory argument list from the factory method for the object that is represented by the component. Together, these attributes and arguments constitute the plugs of the part.

Also, the sockets of a part may be determined by using a similar method. A method of determining the sockets of an identified part includes the step of retrieving the interface for the component that corresponds to the part. Once this interface has been retrieved, the sockets of the part may be identified. The sockets are identified by determining attributes from the retrieved interface and by determining operations from the retrieved interface that returns an object result. Together, these attributes and operations constitute the sockets of the part.

In another aspect of the invention, the plugs of a part may be determined based upon their matching with a previously chosen socket. In this method, a second part is identified and a socket of this second part is chosen. Next, it is determined whether the chosen socket of the second part is compatible with a determined plug of said first part and indicating this match. The chosen socket is compatible with a plug of the original part if the type of the plug is a CORBA object, is the same as the socket type, or if the plug type is any type from which the socket inherits. Similarly, if a plug is chosen first from a part, this chosen plug may match with a socket of another part if the type of the socket is the same as, or inherits from the plug type. In this embodiment, the sockets may be determined in a recursive manner using "tunneling".

A distributed object application program may be constructed in one embodiment by choosing a first component from the component catalog. Once chosen, a first part corresponding to this first component is created in the composition builder. Next, a first interface for this first component is retrieved. The filtering technique as described in the present invention is then used to filter this first interface in order to produce a list of the plugs and sockets for the first part. Once this first interface is filtered, the procedure may be repeated for a second, or any number of other components. Once plugs and sockets of various parts have been determined, they may be connected in order to at least partially define a distributed object application program. And when the program executes, the parts are arranged to pass references to one according to these connections.

Additionally, in a further embodiment of the invention the filtering may take place within a visual application builder using a graphical user interface in which the plugs and sockets are represented symbolically by icons for each part. Connections may be formed by selecting an icon or part with a gesture and then using a visual inspector to choose a particular plug or socket to make the connection. These connections may be represented visually in a composition worksheet of the visual builder.

BRIEF DESCRIPTION OF THE DRAWINGS

The invention, together with further advantages thereof, may best be understood by reference to the following description taken in conjunction with the accompanying drawings in which.

DETAILED DESCRIPTION OF THE INVENTION

OVERVIEW

Figure 1:
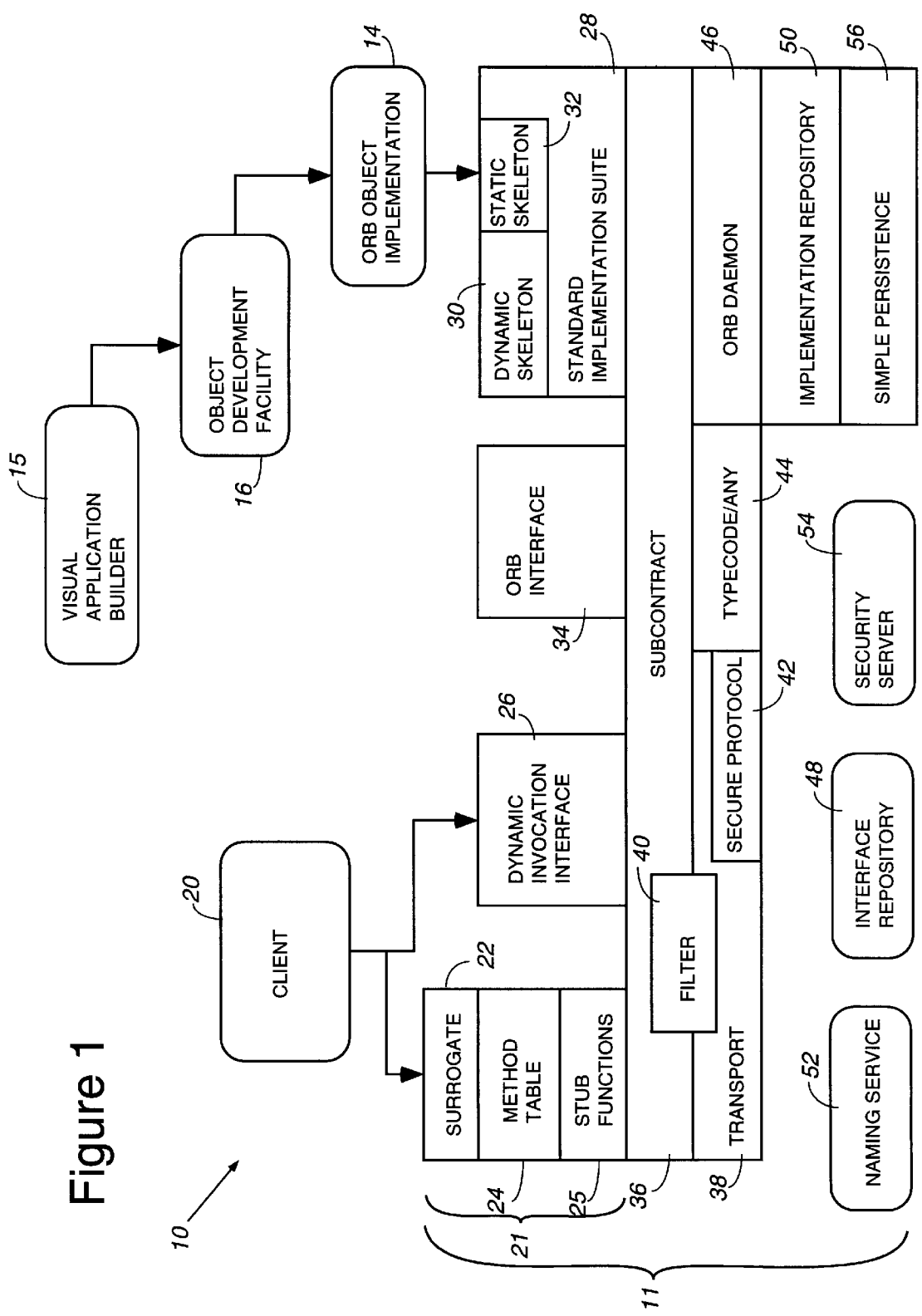
FIG. 1 is an overview of an object request broker of a distributed object system in accordance with one embodiment of the present invention.

The present invention is directed toward distributed object systems and will be described with reference to several preferred embodiments as illustrated in the accompanying drawings. The invention may be practiced within the context of any suitable distributed object system, including those defined under CORBA or any other suitable specification. However, for purposes of illustration, an embodiment of the present invention will be described primarily within the context of an Object Request Broker (ORB) implemented under the CORBA specification from the Object Management Group (OMG), Revision 2.0, dated July 1995, which is incorporated herein by reference. FIG. 1 diagrammatically illustrates the overall architecture of a representative distributed object system suitable for implementing an embodiment of the present invention.

A distributed object system 10 typically includes an Object Request Broker (ORB) 11 as is symbolically illustrated in FIG. 1. ORB 11 provides all of the location and transport mechanisms and facilities necessary to deliver a call from a client to a servant (target object) and to return a response to the client. The client and servant may be located in the same process, in different processes on the same machine, or on completely different machines. For the purposes of this discussion, client 20 may be any code that invokes an operation on a distributed object and thus may or may not take the form of a distributed object or a process. A distributed object may have a wide variety of representations. By way of example, the distributed object may be a C++object that has been provided by an application developer. Alternatively, an implementation for a distributed object may be developed within a visual application builder 15. This visual application builder allows a developer to visually select existing object types from a catalog and graphically connect the services provided by one object to the services needed by another (attributes, arguments, results etc.) in order to create a new implementation for an object.

An object development facility 16 may be used to simplify the creation and the installation of distributed objects. It is used to "wrap" or encapsulate developer objects in distributed object code. As such, object development facility 16 may be used to transform a developer object into an ORB object implementation 14. In this example, ORB object implementation 14 is presented as a server as shown by its location in the diagram. A developer uses an interface definition language to define an interface for an ORB object, provides a developer object implementation that implements that object's behavior, and then uses the object development facility 16 in order to produce an ORB object implementation 14. At run time, an instance of this ORB object (a servant object) is created that will utilize this ORB object implementation 14. It should be appreciated that the object development facility may also be used to create objects that take the role of clients at some point.

Client 20 communicates with a servant by way of a stub 21, a subcontract layer 36, possibly a filter 40, and a transport layer 38. Stub 21 includes a surrogate 22, a method table 24 and stub functions 25. Client 20 communicates initially with surrogate 22 that appears to the client as the servant object. Alternatively, client 20 may communicate directly with the servant object through a dynamic invocation interface (DII) 26 instead of through surrogate 22, method table 24 and stub functions 25. Dynamic invocation interface 26 is used to enable clients to construct dynamic requests.

Subcontract layer 36 provides the functionality required by an object in order to utilize subcontracts to implement various services (or features or object mechanisms) named by a particular subcontract, as described in greater detail in U.S. patent application Ser. No. 08/554,794, filed Nov. 07, 1995 now issued as U.S. Pat. No. 5,577,251. A subcontract identifies a quality of service provided by the distributed object system that may be utilized by an individual object. For example, a subcontract may identify that the feature of security is to be used for a particular object. A technique by which a particular subcontract may be associated dynamically at run time with a servant object is described in U.S. patent application Ser. No. 08/670,682 (pending). Filter 40, if being used, may perform a variety of tasks, such as compression, encryption, tracing, or debugging, that are to be applied to communications to and from an object.

Transport layer 38 operates to marshal, unmarshal and physically transport information to and from a servant that typically does not share the same process as a client. Mechanisms for marshaling and unmarshaling inter-object communications are described in U.S. patent application Ser. No. 08/673,181 (pending). A technique for marshaling/unmarshaling an object reference is described in U.S. patent application Ser. No. 08/670,681 (pending).

A standard implementation suite 28 (or object adapter) represents a set of subcontracts that interact with ORB objects 14 in identical ways, as for example object key management. One such implementation suite is described in U.S. patent application Ser. No. 08/669,782 (pending). It should be noted that a subcontract may belong to multiple implementation suites. Also, implementation suites may utilize different subcontracts. A skeleton, that may take the form of either static skeleton 32 or dynamic skeleton 30, is used to transform requests into a format required by a servant object. Thus, skeletons 30 and 32 call an appropriate servant object. Static skeleton 32 is used to call interface-specific object implementations 14, while dynamic skeleton 30 is used generically when interface-specific objects are not available. An ORB interface 34 is the interface that goes directly to the ORB that is the same for all ORBs and does not depend upon an object's interface or object adapter.

An ORB daemon 46 is responsible for ensuring that object servers are active when invoked by clients. A technique for starting object servers is disclosed in pending U.S. patent application Ser. No. 08/835,994, a continuation of U.S. patent application Ser. No. 08/408,645 now abandoned which is hereby incorporated by reference.

Secure Protocol 42 is a secure interoperability protocol that secures the internet inter-ORB protocol and helps to transmit information through transport layer 38 in a secure fashion. This may mean integrity protection, confidentiality, etc. The internet inter-ORB protocol is a protocol that typically communicates between processes on different machines. However, in some cases, the internet inter-ORB protocol may communicate between processes on the same machine. The security server 54 is a security administration server that secures the services that are used between processes on different computers.

Typecode/Any module 44 implements "Typecode" and "Any" objects. Typecode describes an Interface Definition Language (IDL) data type, allowing type descriptions to be transmitted between clients and servers. An instance of an IDL data type may be encapsulated by an Any object. An Any object refers to typecode of the encapsulated data, and a generic encoding of the data.

An implementation repository 50 is used to store information relating to object servers. Specifically, implementation repository 50 stores the information needed to start a server process. For example, implementation repository 50 stores information such as the location of the server program, any arguments to the program, and any environment variables to pass to the program, etc.

Simple persistence 56 uses an Interface Definition Language (IDL)-defined type and the output from running that IDL type through the IDL compiler, together with a portion of additional code so that an IDL-defined type can be read from, and written to, disk. A naming service 52 is used to name ORB objects. A client may use naming service 52 to find a desired object by name. Naming service 52 returns an object reference, that in turn may be used to send requests to that object. An Interface Repository 48 (IFR) knows about all interfaces for all objects within the distributed object system.

DESCRIPTION OF THE PREFERRED EMBODIMENTS

An embodiment of the present invention relates to a technique for filtering the definition of an object for use within an application builder. By use of this technique, the services that an object (either local or remote) needs or provides in order to function as a piece of an application program may be determined and used by an application developer. The benefits include reusability of objects, quicker build time, and an easier build within the context of a visual application builder. As referred to herein, the term "object" may mean the object definition, associated operations, attributes, etc., and implementation for that object. As will be appreciated by those of skill in the art, at times the term "object type" is used to refer to the definition of the operations and attributes that software external to the object may use to examine and operate upon the object. The "object type" is also know as the "interface". Also, the term "object" may be used to refer to an actual run-time instance of an object and will be made clear by the context.

As discussed above, it would be desirable to have a technique and apparatus that would allow an application developer to reuse existing objects and that would allow a developer to be able to locate objects in a distributed environment to be used within a new application program. By way of example, one such technique and apparatus, called a "Visual Application Builder", is described in the following co-pending U.S. patent applications filed on the same day herewith: U.S. patent application Ser. No. 08/675, 563 (pending); U.S. patent application Ser. No. 08/675,850 (pending); and U.S. patent application Ser. No. 08/674,828 now issued as U.S. Pat. No. 5,860,004. Each of these co-pending U.S. patent applications is incoporated herein by reference in its entirety and for all purposes.

The Visual Application Builder allows an application developer to visually construct an application program using distributed objects. A catalog of existing and previously defined objects is provided so that the developer may easily identify and retrieve remote objects for use in developing new software applications. Additionally, these objects may be reused within the Builder when forming new objects, thus permitting the reuse of code. When an object is selected for use within the Builder it may provide certain services or it may require services for its own use. By way of example, an object may have attributes that may take values, and may have operations (or methods) that require arguments and return results. Services required by an object may be values for its attributes and argument values for its operations. Likewise, services provided by an object may be its attributes that already have values and the results of operations. When building an application, services supplied by one object may be "connected" or delivered to an object that needs those services for processing. For example, the value of an attribute for one object may be used as an argument for an operation of another object. It is important for the purpose of connecting objects to be able to determine which services are provided by a given object and which services are needed by a given object. A technique and apparatus for performing such functions is the subject of the present invention and is described below.

In an embodiment of the present invention, the terms Component, Part, Plugs and Sockets have the following meanings. A Component represents an object (or object type), the service it provides, its implementation, and its name in the distributed object system naming service. As described in greater detail in the above-referenced U.S.

patent application Ser. No. 08/675,563 (pending), components are present in a component catalog from which a user can examine and choose components to be applied to the application being built. When the user then adds a component to the application that is under construction, a builder mechanism derives a part using the information contained in the component using the methods and mechanisms described herein. A part is a place holder for a future run-time instance of the object represented by the component, and may be treated as the run-time instance for the purposes of establishing connections with other objects and defining property values. When the completed application is processed by the builder, code is generated to represent the part and the actions it performs in relation to other objects in the application. The representation of the part is a place holder for a run-time instance of the object. Thus, when the application finally runs, a run-time instance of the object will be located or created and substituted for the part.

In one embodiment, each part has Plugs and Sockets that may be represented visually by a single plug icon or socket icon respectively. As described above, an object may require values for its attributes and argument values for its operations. A Plug is used to represent such needed services by an object. Other services may also be represented by a plug as will be appreciated by one skilled in the art of distributed object systems. By way of example, a plug represents an attribute of a part or an argument for that part that needs to be filled by a value. In addition, a plug may represent an argument of the component's factory method. These arguments are used by the component's factory method to produce a run-time instance of the part. Such a technique for using a factory method is described in co-pending U.S. patent application Ser. No. 08/891,181, a continuation of U.S. patent application Ser. No. 08/408,634 (now abandoned).

Likewise, any services provided by an object may be termed a Socket. By way of example, a socket may represent an attribute of a part that already has a value or an operation that returns a value. Thus, a socket provides services that are needed by a plug. It is contemplated that many different types of values may be used to fill the value needed by a plug and that sockets may have different types. By way of example, values that are object types may be used. Thus, the complementary nature of plugs and sockets will be seen to allow communication between objects that request services and objects that supply requested services. In one embodiment, such communication is represented by a connection that is made between a plug associated with a first part and a socket on a second part.

Figure 2:
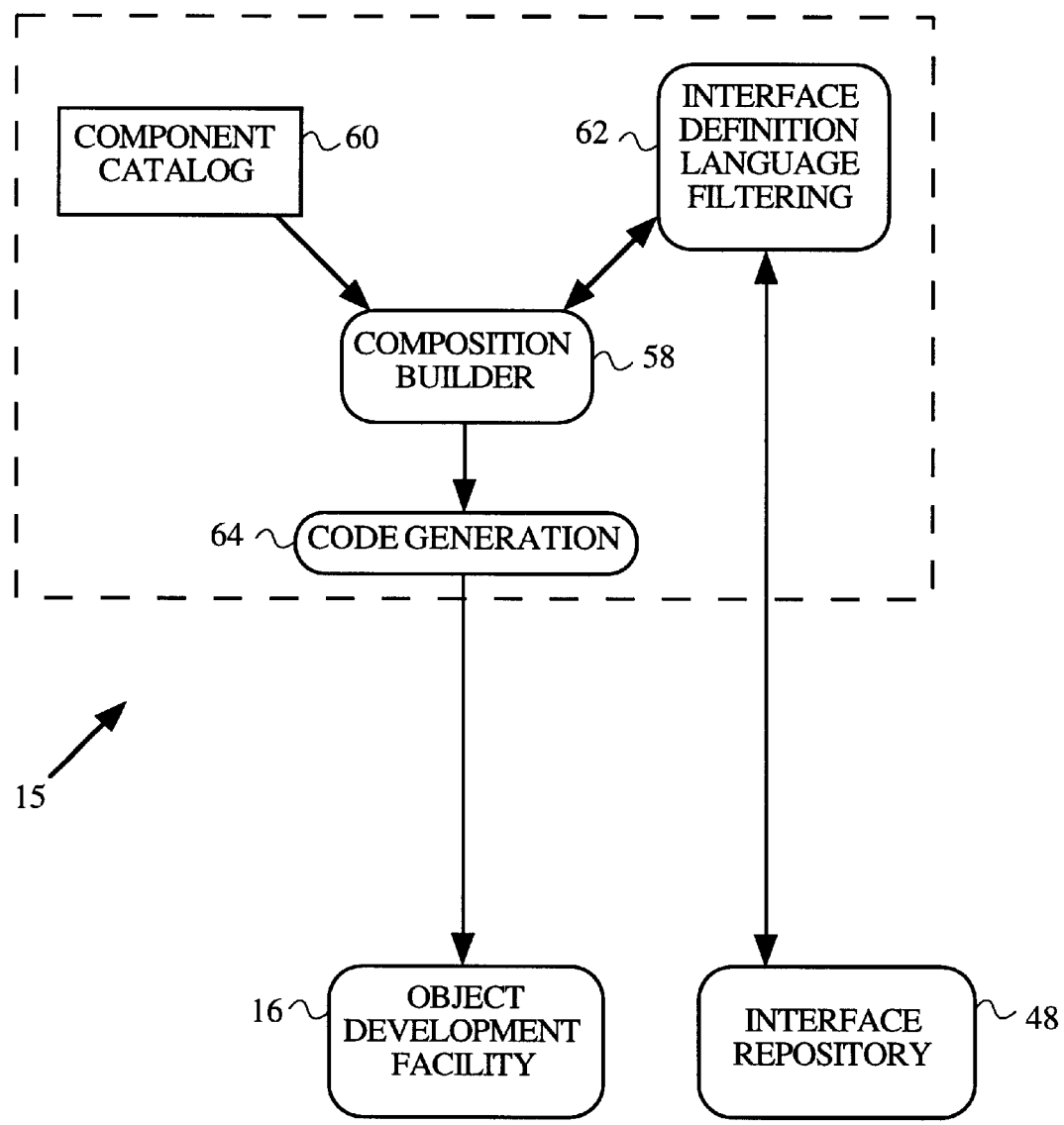
FIG. 2 is a block diagram of the visual application builder that is shown in FIG. 1 according to one embodiment of the present invention.

FIG. 2 illustrates one embodiment of the visual application builder 15 of FIG. 1 that allows a user to build an application using the above concepts of components, parts, plugs and sockets. The composition builder 58, component catalog 60 and code generator unit 64 are described in detail in the patent applications referenced above. The centerpiece of the visual application builder is the composition builder 58. In one embodiment, composition builder 58 uses a graphical user interface that allows an application developer to choose components and connect parts visually in order to implement a new object. This is described in more detail below with reference to FIGS. 4 and 5. When a developer is using the builder 58, he or she may choose a component for use from the component catalog 60. This catalog 60 contains all the components available for use within the distributed object system. The catalog also includes other information related to the component. By way of example, the interface definition language type, the factory type, and the factory method defined upon that component are all available from the catalog.

Once a component has been inserted into the composition builder as a part, it becomes necessary to determine all of the plugs and sockets of this part in order to form a connection with another part or object interface. Determination of the plugs and sockets of a part is performed by the interface definition language filtering unit 62 in communication with the builder 58. This unit 62 retrieves an interface for a component from the interface repository 48 and uses this interface in the determination of the plugs and sockets. The operation of this interface definition language filtering unit 62 is the subject of the present invention and will be explained below with reference to FIGS. 6 through 9. Once a new object implementation has been created in the builder 58, this implementation is fed into the code generator unit 64 that produces the source code needed to run the application. This code is then sent to the object development facility 16 that produces code and objects suitable for use within a distributed object environment as described in co-pending U.S. patent application Ser. No. 08/414,240, which is incorporated herein by reference.

Figure 2A:
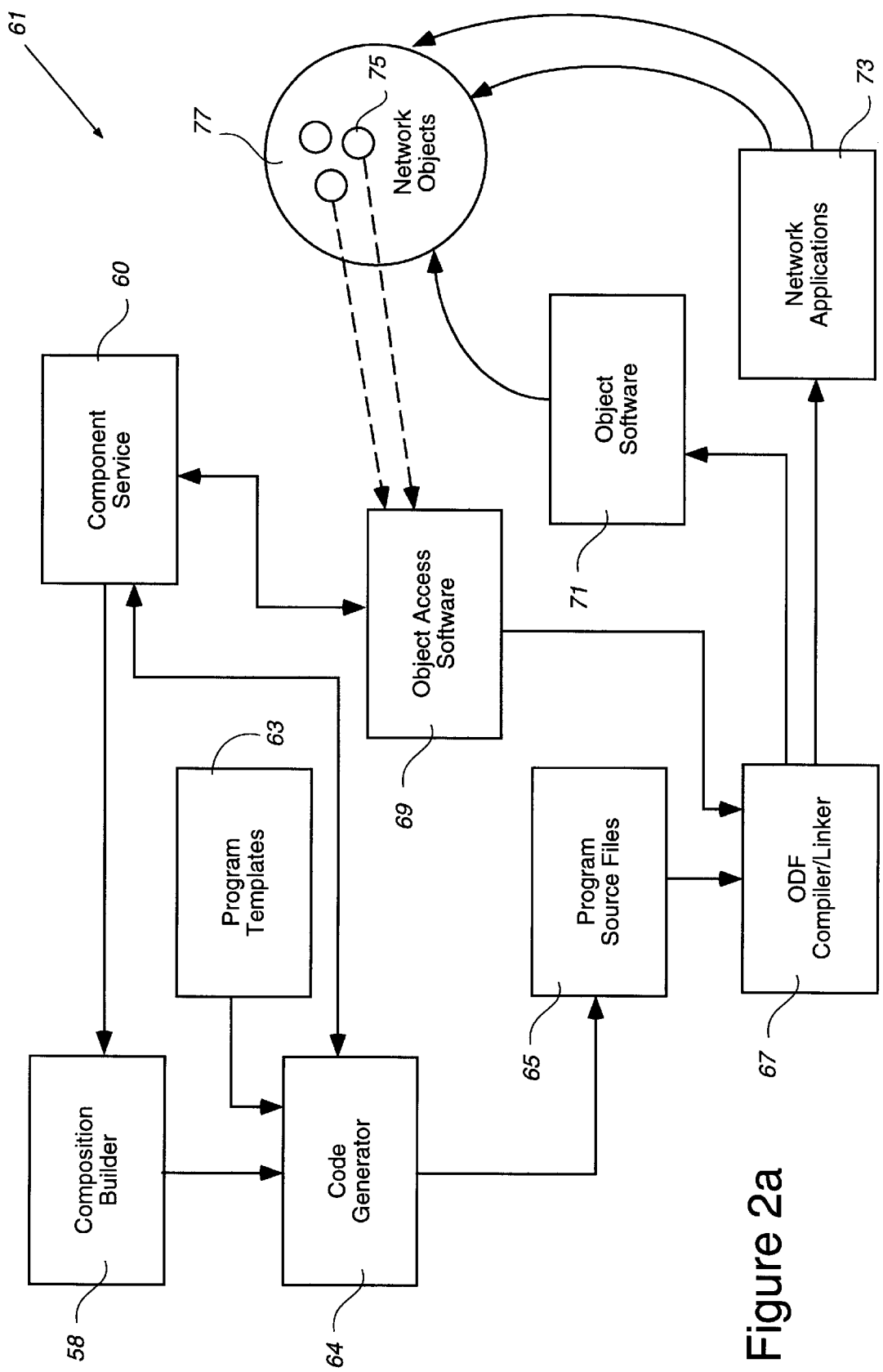
FIG. 2a illustrates schematically the visual application builder of FIG. 2 in more detail for use in composing object-oriented applications in a distributed object system.

FIG. 2a at 61 illustrates schematically a system for composing object-oriented applications in a distributed object system using the visual application builder as described above in FIG. 2. The system includes a composition builder 58 which the user, typically a programmer, employs to compose applications for installation on the distributed object system such as that shown in FIG. 1 and described above. The composition builder is coupled with a component catalog 60 that provides the user or programmer access to objects available on the distributed object system. In brief, the catalog is an inventory of the software resources available to the programmer on the distributed object system. In one embodiment, the catalog provides information to the programmer (and to automatic tools such as the composition builder) regarding the function and implementation of the objects referenced by the components contained in the catalog. Thus it will be seen that the catalog promotes collaboration across the distributed object system by making software assets available to the user and promotes cooperation among software developers by giving them detailed information about the objects and software that are available for their use. Composition builder 58 is further coupled to a code generator 64 which, in conjunction with program template repository 63 takes the composition created by the composition builder and produces program source files as shown at 65.

Programs source files 65 are then forwarded to ODF compiler/linker 67 which is described in the above-incorporated U.S. patent application Ser. No. 08/414,240. In addition, ODF compiler/linker 67 is coupled with object access software 69 which object access software is coupled with component catalog 60. ODF compiler linker 67 produces both object software 71 and network software 73 which in turn accesses network objects 75 as shown generally at 77. These network objects are then employed by the object access software 69 either for use in the component catalog 60 or in conjunction with ODF compiler linker 67 as indicated by the dashed arrows.

Figure 3:
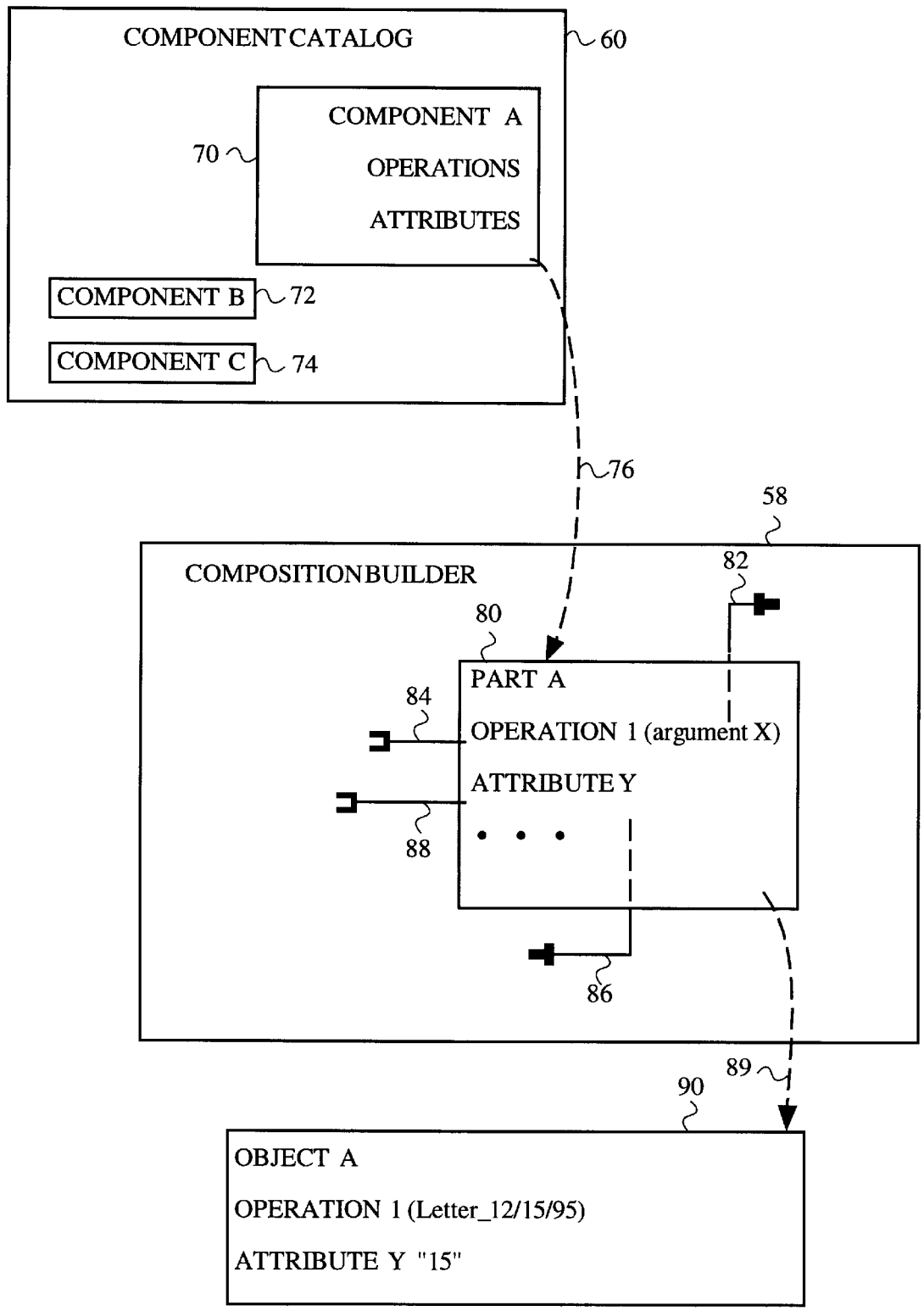
FIG. 3 shows the relationship between the component catalog, the composition builder and a run-time object in the context of the visual application builder, according to one embodiment of the present invention.

FIG. 3 shows the relationship between a component in the component catalog, its corresponding part in the composition builder and the object that the part represents. The catalog 60 may include any number of components. Shown in particular are a component A 70, and components B 72 and C 74. Component A 70 may have defined upon it various operations and attributes by way the interface of its associated object. Once a developer selects component A and places it into the composition builder 58 (represented by dashed arrow 76) it becomes a part that is a representation of an object. Because an object only exists at run-time, a part is a place holder for an object.

Shown within the composition builder 58 is an inserted Part A 80 that corresponds to component A 70. This Part A has defined upon it an Operation 1 and an Attribute Y. The argument to Operation 1 is Argument X that constitutes one possible plug 82 of Part A 80. Operation 1 returns a value that constitutes one possible socket 84 of part A. Also, Attribute Y needs a value as shown by plug 86. And once Attribute Y has a value, it becomes a socket 88 of part A. Of course, many other plugs and sockets for Part A are possible. This Part A used at development time represents the run-time Object A 90 as indicated by dashed arrow 89. In other words, at run-time this Part A will be instantiated as Object A and used in the execution of the application program. The arguments, operation results and attributes of an object will have real values at run-time. By way example, for Object A the Argument X for Operation 1 is the document "Letter_ 12/15/95" indicating that this argument is a file containing a letter written on Dec. 15, 1995. Likewise, the Attribute Y has the value of "15". It is also contemplated that values for the arguments and attributes of a part may be set within the builder 58 by way of a user interface as explained below with reference to FIG. 4.

Figure 4:
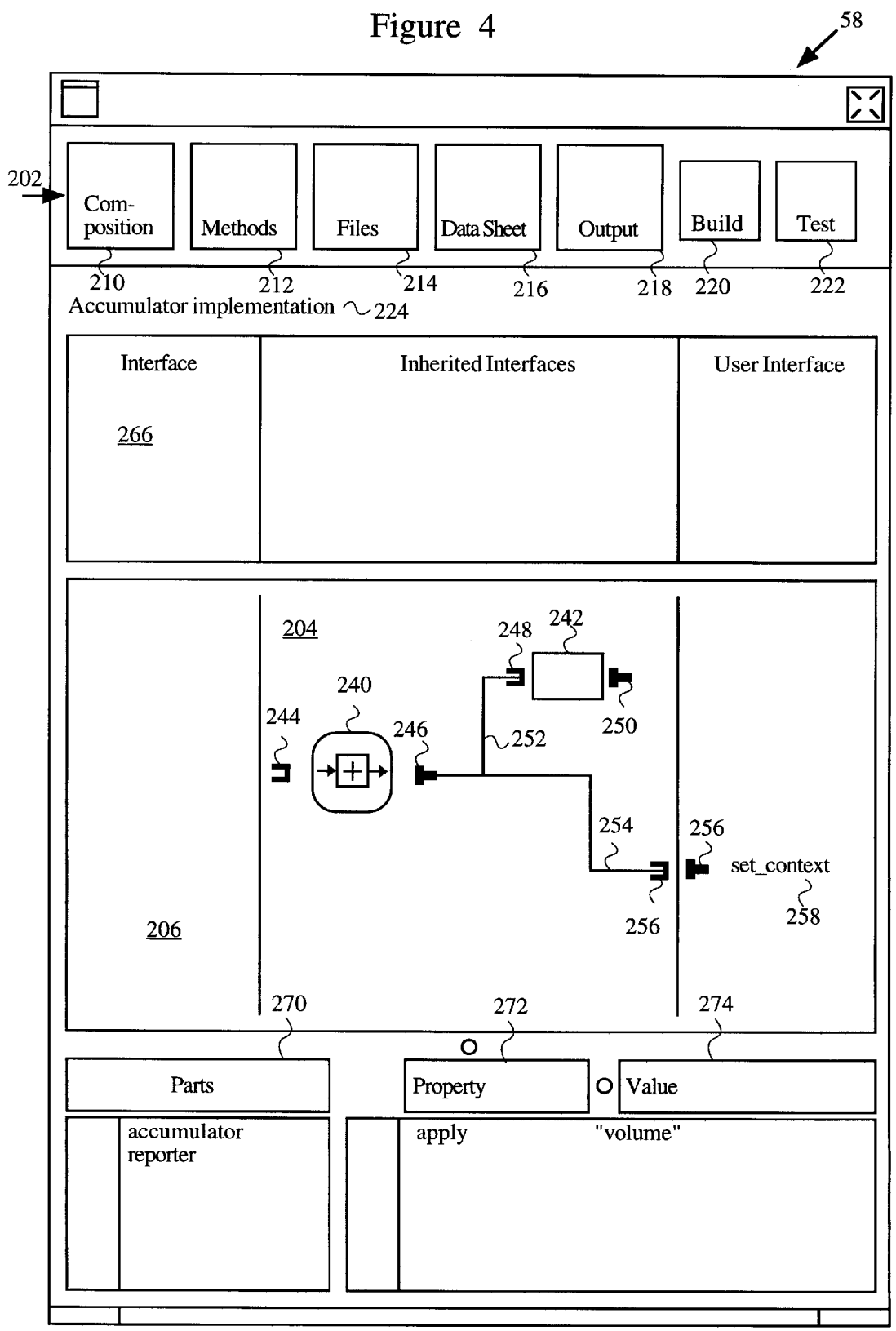
FIG. 4 is a view of the composition builder in which the inspector is being used to set a property value, according to one embodiment of the present invention.

FIG. 4 shows in detail one possible representation of the composition builder 58 of FIG. 2. The builder 58 includes a menu bar 202 for selecting various views and functionalities of the builder, a composition worksheet 204 for connecting parts and an inspector 206 for listing the plugs and sockets of a part and for setting the values of properties (or attributes) of a part. The builder may have many different views available that are chosen through the menu bar 202. By way of example, the view associated with a particular composition is shown in FIG. 4 and is selected by button 210. This view will be used for describing embodiments of the present invention. In addition, buttons 212 through 222 present other related views for use in the construction of an application. The box 224 is a message that explains the currently highlighted element, in the example this is the "accumulator" part. And the section "Interface" 226 names the interface for the current implementation. These portions of the builder and others are described in greater detail in the above-referenced U.S. patent application Ser. No. 08/675, 850 (pending), which is incorporated by reference.

Below this top portion is the composition worksheet 204 in which parts are placed (after selection from the catalog) and then connected to define the interrelationships among the objects that make up the application. It is contemplated that this worksheet may contain any number of parts and interconnections thereamong. By way of example, shown are the parts "accumulator" 240 and "reporter" 242. Part 240 has a socket icon 244 representing all of the sockets for this part, and a plug icon 246 representing all of the plugs of part 240. When a user selects the plug icon 246 a list of all plugs for that part are displayed below in the inspector 206. Likewise, when the socket icon 244 is selected a list of all sockets for that part are displayed below in the inspector 206. These lists of plugs and/or sockets may be determined by filtering the interface definition for the part as will described below with reference to FIGS. 6 and 8. Shown is one particular plug of part 240 making a connection indicated by a connection line 252 with a socket 248 of part 242. Another plug of part 240 has made a connection 254 with a socket 256 of the User Interface 230 through a "set_ context" method 258. Likewise, a technique for connecting plugs to sockets and vice-versa according to one embodiment of the invention will described below with reference to FIGS. 7 and 9.

The inspector 206 allows a developer to view and manipulate the plugs, sockets and properties of a part in many different manners. Various views are associated with the inspector, and the inspector may change its appearance based upon what is selected in the worksheet or based upon an action taking place in the worksheet. By way of example, the inspector may be used to set values for properties. As used herein, "properties" means a grouping of information needed by a part that may be set by a user. By way of example, the properties of a part include attribute values of that part and argument values for operations defined upon that part. When a part is selected in the worksheet 204, the inspector may take the form as shown at the bottom of FIG. 4. In this view, the inspector 206 has a first column 270 for listing the parts of the worksheet 204, a second column 272 for listing the properties of a chosen part, and a third column 274 for setting or viewing a value for a chosen property. In this example, the property "apply" of the part "accumulator" is shown to have the value "volume". The inspector may have other functions a well. The inspector may be used to view all of the plugs of a chosen part, or all of the sockets of a chosen part. The inspector may also be used to form a connection between a plug of one part and the socket of another as shown in FIG. 5.

Figure 5:
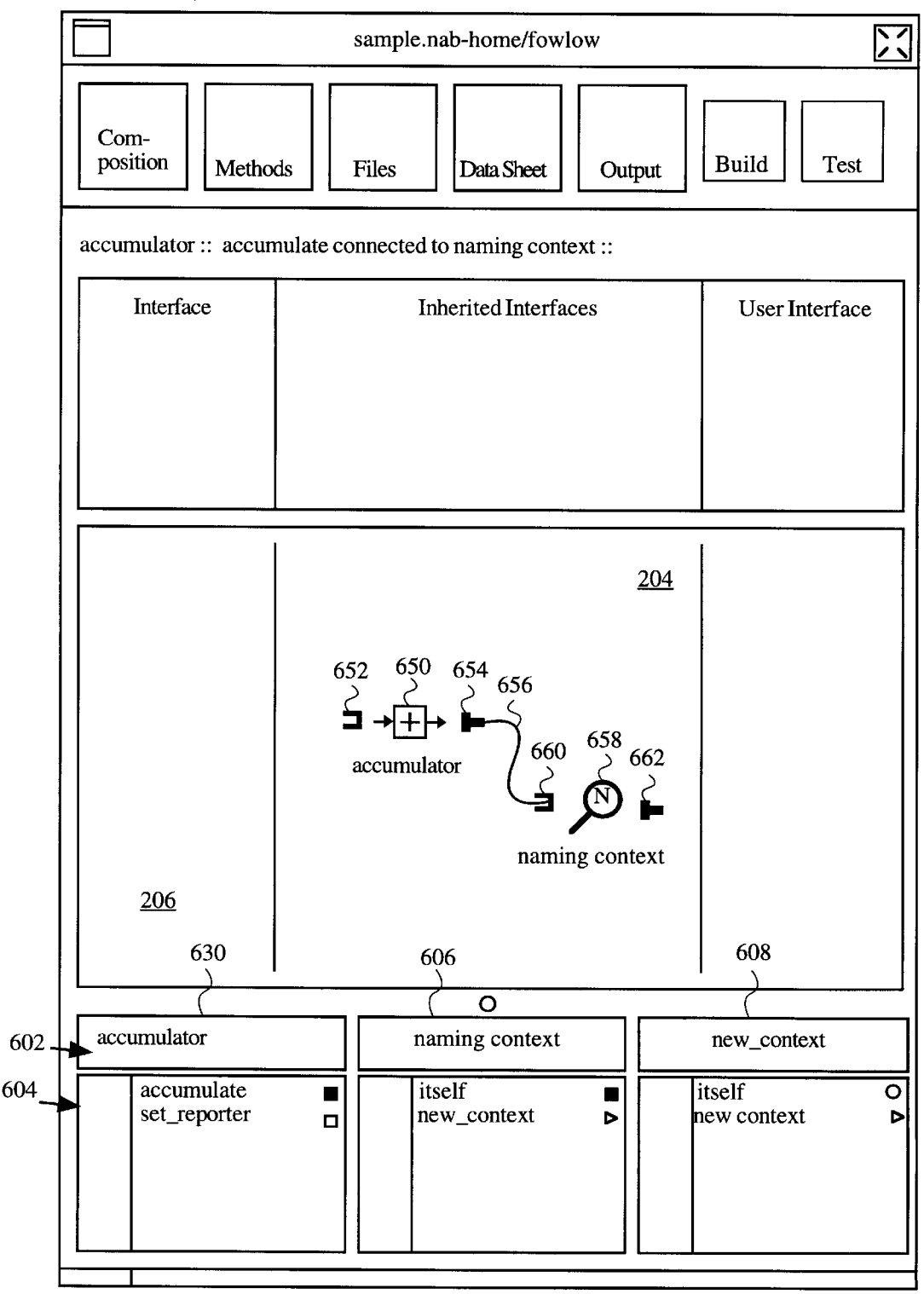
FIG. 5 is a view of the composition builder in which the inspector is being used to connect a plug to a socket, according to one embodiment of the present invention.

FIG. 5 illustrates another view of an embodiment of the builder 58 in which the inspector 206 is being used to connect a plug of one part to the socket of another. Shown in the worksheet 204 is an "accumulator" part 650 having a socket icon 652 and a plug icon 654. Another part "naming context" 658 has a socket icon 660 and a plug icon 662. A connection is being formed between a plug of the "accumulator" and a socket of the "naming context" as indicated by the connection line 656. The use of the inspector in this process will be explained in more detail below with reference to FIGS. 8 and 9. The visual manner in which the inspector operates and in which a connection is formed may be presented in many different ways. By way of example, one such manner is shown in the accompanying figures and is described in the above-referenced U.S. patent application Ser. No. 08/675,850 (pending).

Turning now to FIGS. 6 through 9, one embodiment of a technique for filtering the interface of an object will be described. As discussed above, the interface of an object may specify the characteristics of that object; that is, how other objects may interact with it. By way of example, an interface may specify the operations defined upon that object, the arguments required for each operation and their respective types and the result and type that each operation returns. Also, an interface may specify attributes and their types for an object. The filtering technique of the present invention may be used at any of various points in the process of creating an implementation for an interface. By way of example, filtering may take place as a part is being inserted into the worksheet. Or, if an implementation has already been created or is partially completed, filtering may take place as this implementation as a whole is being read back into the visual application builder. Also, filtering may take place in real time as a developer is choosing the plugs of a part from the worksheet or as a developer is choosing a socket from a part. Filtering of an interface produces plugs and sockets that may be used by a developer in connecting parts within the worksheet. And the results of this filtering may appear in the inspector for use by the developer.

Figure 6:
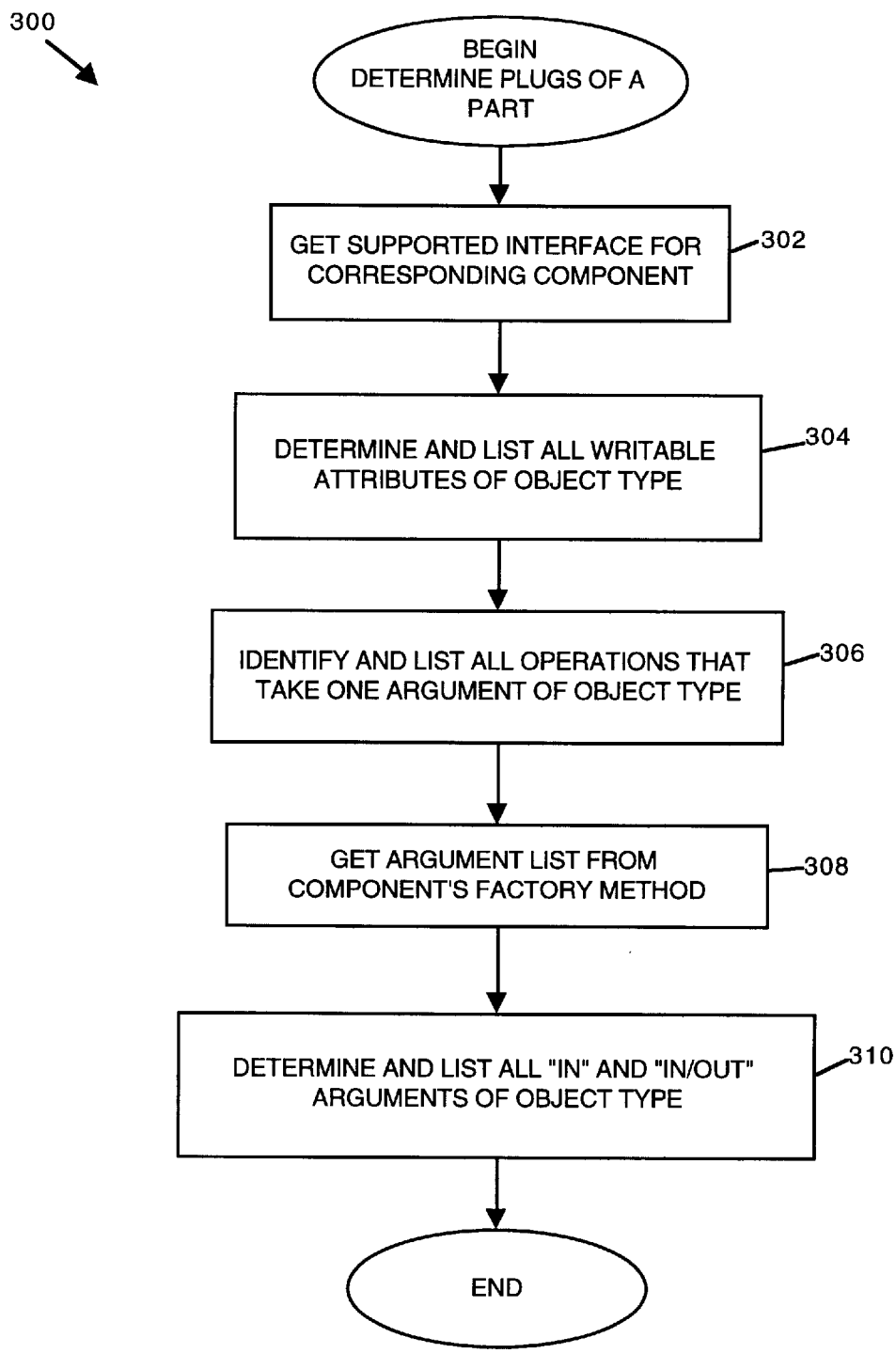
FIG. 6 is a flow chart for determining all of the plugs for a given part in the composition builder, according to one embodiment of the present invention.

FIG. 6 shows a procedure 300 for determining all of the plugs for a given part by filtering the interface of a component corresponding to that part. As described above, a plug may be an attribute of a part or an argument for an operation defined on a part. As the plugs are determined, they may appear visually for the user to browse and select. Many techniques may be used for visually presenting these plugs to the user. By way of example, these plugs may appear in the inspector of the composition builder and may be listed by name and type.

In a first step 302, the supported interface for the corresponding component is retrieved. Because a part is a build time instance of a particular component, the interface that is supported by that component must be determined in order to identify the plugs for that part. The supported interface is retrieved by accessing the Interface Repository 48 (IFR) as shown in FIG. 2. The IFR contains interfaces defined within the distributed object system. Once the interface for this component has been retrieved, it is then available for filtering as described in the below steps.

Step 304 determines all attributes of the interface that are not read-only and are also an object type. Once these attributes are determined, they may be listed by name and type in the inspector as described above. Because a connection passes an object reference from a socket to a plug, only attributes of type object are determined in this embodiment. Attributes that are read-only are not listed since no value can be written to such an attribute. Examples of read-only attributes include, for example, attributes having a constant value, or attributes that are initialized at application start-up and remain unchanged throughout. The visual aspect of the composition builder in which a plug is connected to a socket is used for the purpose of passing an object reference from one part to another through a connection between the objects that is represented by a line from the plug of the object receiving the object reference to the socket of the object passing the object reference. Values that are not of type object are not passed through a connection, and thus an attribute that does not have a type of object is not considered a plug.

Next, step 306 identifies all operations defined upon the part that take one argument of type object. Again, because objects references are passed through a connection, it is necessary to determine operations that need an argument that is of type object; it is preferable to identify only those operations that take one argument of type object. In this manner, a plug representing this operation may be represented by a single connection line that is connected to one socket. Although it is contemplated that an operation that takes many arguments of type object may have a web of plugs to be connected to various sockets, it is preferable to identify operations that need one argument of type object. And, as in step 304 above, these identified operations may be listed by name and type in the inspector of the composition builder.

In step 308, the argument list is determined from the component's factory method. The factory method for the component may be determined by referencing the component itself in the catalog. Step 310 then processes these arguments by determining all "in" arguments and all "in/out" arguments that are of type object. An "in" argument is an argument that is passed into a method and remains unchanged, while an "in/out" argument is not only passed in but also may have its value changed. In one embodiment, the arguments needed by the component's factory method are determined to produce a run-time instance of the object for the composition builder to construct an implementation. The factory method is used to create an instance of a particular object type. Hence, all arguments of type object are determined instep 310, and may be displayed by name and type in the inspector. After step 310, this determine plugs procedure ends.

Figure 7:
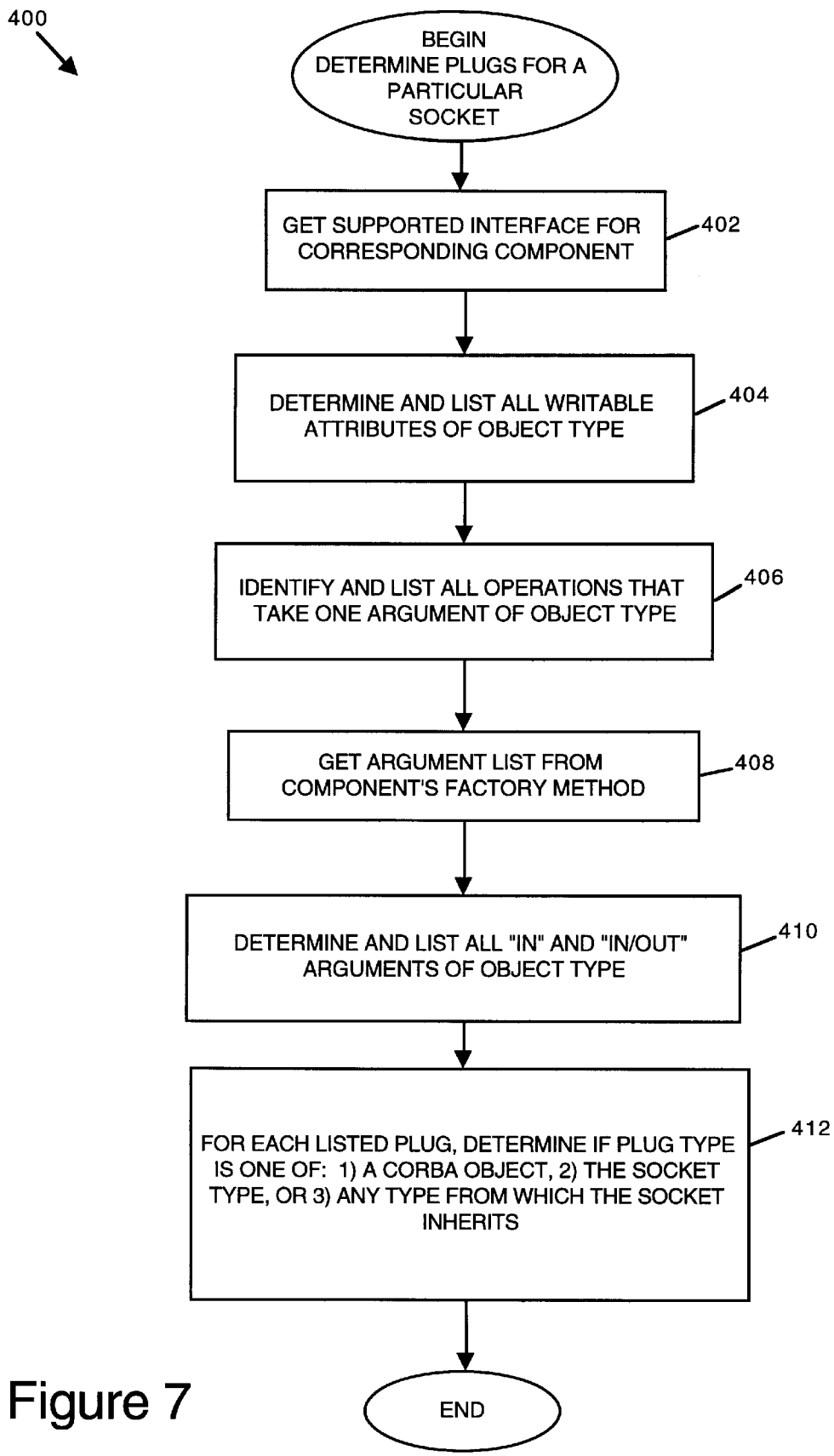
FIG. 7 is a flow chart for determining all of the available matching plugs of a given part for a particular socket, according to one embodiment of the present invention.

FIG. 7 illustrates one scenario in which the user has already chosen a particular socket from a part and is now seeking to determine which plug of a different part may match that socket. In this situation, although the plugs available may be determined in a manner similar to FIG. 3, the plugs actually available will be constrained by the type of socket chosen. For example, for a given socket, a plug will only match if either (1) its type is a CORBA object, (2) its type is the same as the socket type, or (3), if the plug type is any type from which the socket inherits. This constraining of a plug to be chosen will be explained further below with reference to step 412.

In a first step 402, the supported interface for the corresponding component is retrieved. Because a part is a build time instance of a particular component, the interface that is supported by that component may be used to identify the plugs for that part. The supported interface is retrieved by accessing the Interface Repository 48 (IFR) as shown in FIG. 2. The IFR contains interfaces defined within the distributed object system. Once the interface for this component has been retrieved, it is then available for filtering as described in the below steps.

Step 404 determines all attributes of the interface that are not read-only and are also of type object. Once these attributes are determined, they may be listed by name and type in the inspector. Attributes that are read-only, i.e., cannot be written to, are not listed because no value can be written to such an attribute. An example of an attribute that might be read-only is an attribute that has a constant value, or an attribute that is initialized at application start-up and remains unchanged. In a preferred embodiment, object references are passed from socket to plug. In this embodiment, attributes that are of type object, i.e., an object reference may exist, are listed.

Step 406 identifies all operations defined on the part that take one argument of type object. Because objects references are passed through a connection, it is necessary to determine operations that need an argument of type object. In one embodiment, those operations that take one argument of type object are identified. In this manner, a plug representing this operation is represented by a single connection line connected to one socket. Although it is contemplated that an operation taking many arguments of type object may have a web of plugs to be connected to various sockets, it is preferable to identify operations that need one argument of type object. As in step 404 above, these identified operations are listed by name and type in the inspector of the composition builder.

In step 408, the argument list is determined from the component's factory method. The factory method for the component is determined by referencing the component itself in the catalog. Step 410 now processes these arguments by determining all "in" arguments and all "in/out" arguments that are of type object. An "in" argument is an argument that is passed into a method and remains unchanged, while an "in/out" argument is not only passed in but also may have its value changed. In one embodiment, the arguments needed by the component's factory method are determined to produce a run-time instance of the object for the composition builder to construct an implementation. The factory method is used to create an instance of a particular object type. Hence, all arguments of type object are determined in step 410, and are displayed by name and type in the inspector.

Step 412 determines if for all of the determined plugs above, if the plug type is appropriate to match the chosen socket. The plug will match the socket if either (1) the plug type is a CORBA object; (2) the plug type is the same as the socket type; or (3) the plug type is any type from which the socket inherits. Because a CORBA object is a base object from which all objects inherit, if the type of a plug is a CORBA object, the plug will accept any CORBA object. Of course, if the plug type is the same as the socket type, then there is also a match. Also, if the plug type is a type from which the socket inherits, then by necessity, the socket will match a given plug because the socket is of a type that is the same as the plug. These plug types that match will then be listed in the inspector for a possible connection by the developer. After step 412, this procedure ends.

Figure 8:
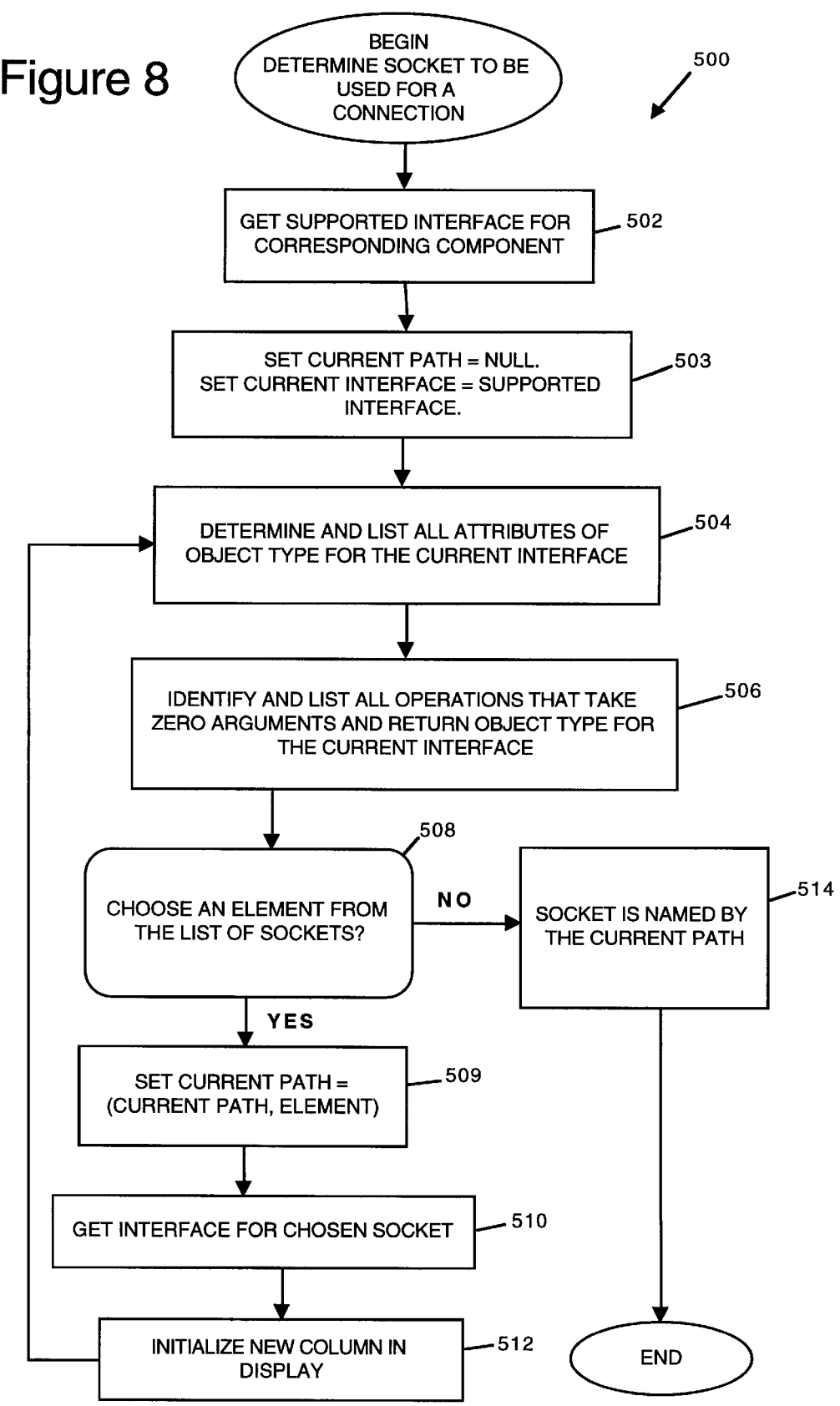
FIG. 8 is a flow chart for determining a socket of a part to be used for a connection to another part, according to one embodiment of the present invention.
Figure 9:
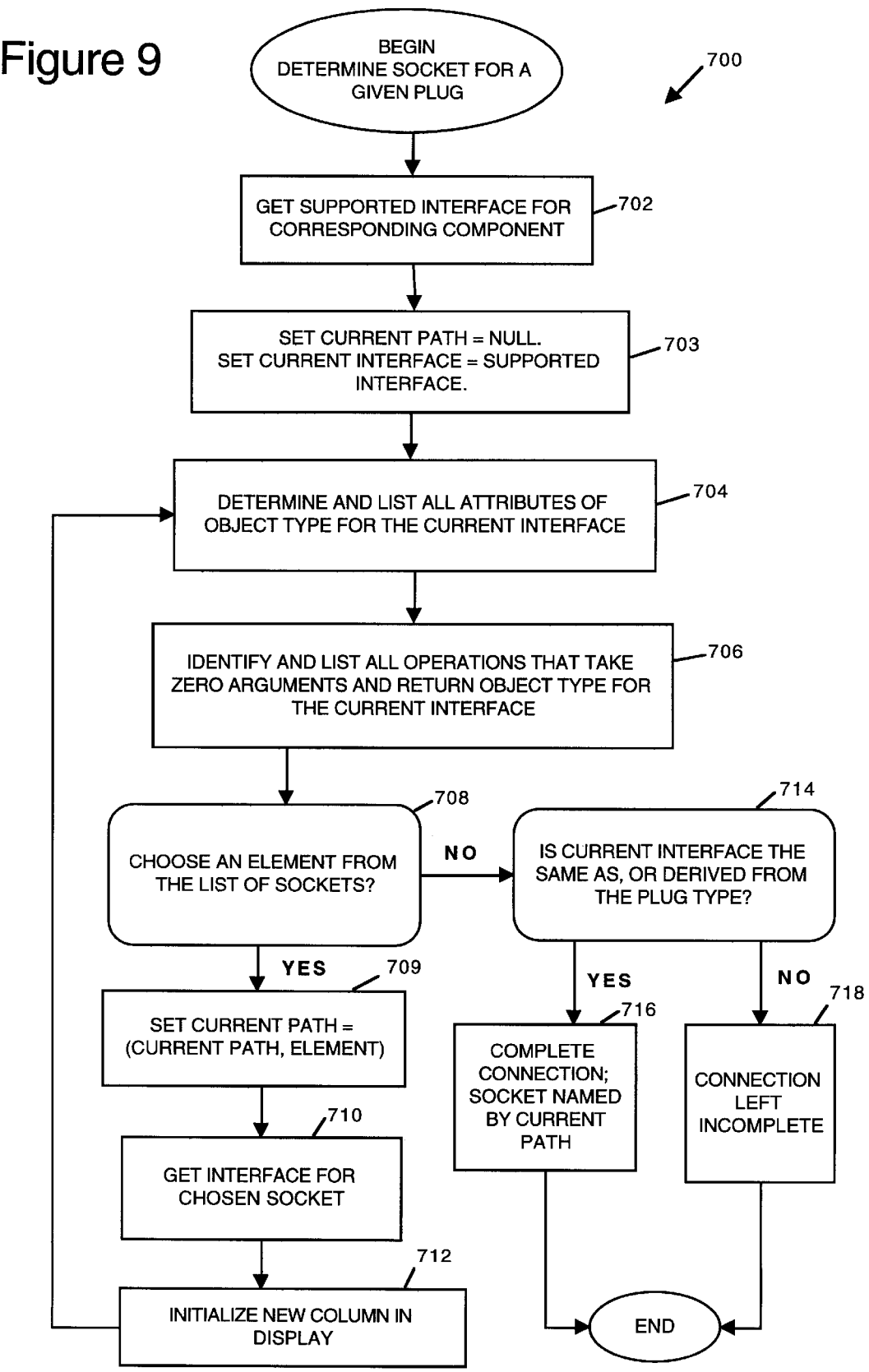
FIG. 9 is a flow chart for determining a matching socket of a part for a connection to a given plug, according to one embodiment of the present invention.

FIGS. 8 and 9 illustrate different aspects of the inspector according to embodiments of the present invention. In FIG. 8 the inspector is used to choose a socket, while in FIG. 9 the inspector is used to choose a socket after a plug has been chosen. Accordingly, the inspector 206 as shown in FIG. 5 will now be described. This view of the inspector relates to the sequence of steps shown in FIG. 9, although it will be apparent from the explanation below that a similar version of the inspector is applicable to FIG. 8. The inspector 206 includes column headings 602 and the contents of the columns at 604. Although only three columns are shown, it should be appreciated that any number of columns may be present in the inspector as a socket may be associated with additional other sockets. For example, if an operation is chosen for the socket of a part, that operation may in turn require arguments that receive values from other sockets. These other sockets are also listed within the inspector in a different column. And recursively, these other sockets may in turn receive services from additional sockets that will be listed in yet another column. Thus, numerous columns may be presented. Such a relationship among sockets will also be referred to herein as "tunneling". The inspector shown has a first column 630 that indicates all of the plugs of the part 650. Shown in particular are the plugs "accumulate" and "set-reporter" for the part "accumulator". These plugs may be viewed by selecting the plug icon 654. The plug "accumulate" is highlighted to indicate that it has been chosen for making a connection. Next, is a second column 606 that indicates the sockets of a particular part. Shown in particular is the part 658 "naming context" that has sockets "itself" and "new_contex". These sockets may be viewed by selecting the socket icon 660. The socket "new_context" is highlighted to indicate that it has been chosen for making a connection. Once a socket is chosen from the second column, it may reference further sockets that will then appear in a third column 608. Thus, this third column is labeled "new_context", and its sockets appear below. This is due to the "tunneling" relationship described above.

The second column 606 contains the term "itself" at 610. This is a key word that references the actual part chosen. For example, if the user chooses a part and is searching for a socket of that part to be used in a connection, it may be that the user desires to use the part itself to pass through a connection to a plug. In this situation, the user is not searching for an attribute or a return value from an operation of the part, but desires to return the part itself. This is possible because a part is (or is a place holder for) an object, and objects (represented by object references) are passed through connections.

Correspondingly, the term "itself" also appears in third column. In this example, the user has selected "new_context" that is shown highlighted. When this socket is chosen, other possible sockets that are available through this socket due to "tunneling" are now shown in the third column. In this example, the additional sockets available are "itself" and "new_context". A procedure for allowing the developer to choose a socket of a part will now be explained with reference to FIG. 8.

FIG. 8 shows a procedure 500 for determining a socket of a part to be used for a connection. In this situation, the developer has chosen a part and wishes to select a socket of that part to be used in a connection to be formed later. This procedure begins at step 502 by retrieving the interface that is supported by the component corresponding to the part. This interface may be retrieved in a similar fashion as in step 302 of FIG. 6. Next, in step 503 a variable Current Path is set equal to the null set and another variable Current Interface is set equal to the retrieved interface. The variable Current Path will denote a path that names the current socket to be chosen. The variable Current Interface denotes the current interface that is being filtered. Because "tunneling" may occur, it is necessary to keep track of a current interface.

In step 504 all attributes of the Current Interface are determined that are of type object. This step 504 may be performed in a similar fashion as in step 304 of FIG. 6. In addition, those attributes that are read only are also determined. This is because that even though an attribute of a part may be read only, if it is of type object, it may still be used as a socket to pass a value through a connection to a plug. Once these attributes are determined, they may be listed by name and type in the inspector. These attributes may be listed in a first available column of the inspector. For example, if this is the first pass through this procedure then these attributes determined of the Current Interface will be listed in the first column of the inspector.

Step 506 identifies all operations defined upon the Current Interface that take zero arguments and return a type of object. Because these operations return something of type object they are considered a socket Also, it is preferable to identify those operations that accept zero arguments. Although, it is contemplated that operations that accept more than zero arguments may also be identified. By limiting the identification process to only those operations that take zero, arguments, the socket may be immediately identified. If an operation takes one or more arguments it would also be necessary to find an appropriate socket for each argument in order to supply the value needed for that argument. Once these operations are identified they are also listed by name and type in the inspector. Together, these attributes and operations that are listed in the inspector are termed "elements".

Step 508 checks whether the user has chosen an element from the list of sockets. This list of sockets appears in one of the columns of the inspector. If this is the first pass through this procedure and Current Interface is the supported interface then all of the above-identified sockets for this part will appear in a first column of the inspector 206. Thus, the user might choose the element "itself", or may choose one of the determined attributes or operations. If the user does not choose an element, at this point control moves to step 514. In step 514 the socket that is currently highlighted will be named by the value of the Current Path. This socket may now be used by the developer to establish a connection to a plug of another part. If, however, in step 508 the developer does choose another element then control moves to step 509.

In step 509 the variable Current Path is reassigned to the previous value of the variable Current Path plus the element chosen by the developer. For example, if the developer first chooses a socket of a part "element 1" from a first column of the inspector then Current Path contains "element 1". Next, if the developer then chooses "element 2" from a second column of the inspector then Current Path would be updated to be equal to "element 1, element 2".

Next, in step 510 the interface for that recently chosen socket is retrieved. In addition, the variable Current Interface is updated to be set equal to this newly retrieved interface. Next, this recently retrieved interface must be processed as above in order to determine which sockets it provides. Accordingly, steps 504 and 506 will be repeated in order to determine these new sockets.

Therefore, in step 512 a new column for the inspector is initialized and displayed to hold the new sockets that will be determined from the Current Interface. From step 512 control loops back to step 504 in which the sockets for this Current Interface will be determined and the developer will be allowed to choose one of these sockets. Depending upon the nature of a socket and its interface, it is conceivable that this procedure may be repeated indefinitely. However, depending on the components being connected, at some point in step 508 the developer will not choose another socket and the procedure ends.

FIG. 9 shows a procedure 700 for determining a socket of a chosen part once a plug has been designated from a different part. In this fashion, a plug from a part may be connected to a socket of another. The following steps will be explained with reference to FIG. 5. In this example, a developer has selected a part "accumulator" and has chosen one of its plugs "accumulate" as shown in column 630 of the inspector 206. This plug "accumulate" will now be matched with a socket of the chosen part. The chosen part is the part 658 "naming context". This procedure begins at step 702 by retrieving the interface that is supported by the component corresponding to the chosen part 658. This interface may be retrieved in a similar fashion as in step 302 of FIG. 6. Next, in step 703 a variable Current Path is set equal to the null set and another variable Current Interface is set equal to the retrieved interface. The variable Current Path will denote a path that names the current socket to be chosen. The variable Current Interface denotes the current interface that is being filtered. Due to "tunneling", it is necessary to keep track of a current interface.

In step 704 all attributes of the Current Interface are determined that are of type object. This step 704 may be performed in a similar fashion as in step 304 of FIG. 6. In addition, those attributes that are read only are also determined. This is because that even though an attribute of a part may be read only, if it is of type object, it may still be used as a socket to pass a value through a connection to a plug. Once these attributes are determined, they may be listed by name and type in the inspector. These attributes may be listed in a first available column of the inspector. For example, if "naming context" has any determined attributes, they are listed in the second column 606 of the inspector of FIG. 5.

Step 706 identifies all operations defined upon the Current Interface that take zero arguments and return a type of object. Because these operations return something of type object they are considered a socket. Also, it is preferable to identify those operations that accept zero arguments. In one embodiment, operations that accept more than zero arguments may also be identified. By limiting the identification process to only those operations that take zero arguments, the socket may be immediately identified. If an operation takes one or more arguments it would also be necessary to find an appropriate socket for each argument in order to supply the value needed for that argument. Once these operations are identified they are also listed by name and type in the inspector. Together, these attributes and operations that are listed in the inspector are termed "elements". As shown in FIG. 5, all of these determined elements for "naming context" are shown in the second column. By way of example, these elements are "itself" and "new_context".

Step 708 now checks whether the user has chosen an element from a list of sockets in one of the columns of the inspector. If this is the first pass through this procedure and Current Interface is the supported interface, then all of the above-identified sockets for this part will appear in a first column of the inspector. Thus, the user might choose the element "itself", or may choose one of the determined attributes or operations. By way of example, FIG. 5 shows a situation in which the developer has chosen the highlighted socket "new_context" from the part "naming context". If, however, the developer does not choose an element, control moves to step 714 that will be explained below. However if the developer does choose another element then control moves to step 709.

It is also contemplated that step 508 of FIG. 8 and step 708 of FIG. 9 may be performed by a developer in a first aspect of the invention or may be performed automatically in a second aspect of the invention if an implementation of an object is being read back into the distributed object system. For example, once an implementation has been built by a developer using the composition builder, this implementation may be stored on a computer readable medium. A connection from one part to another part may be stored simply as the name of a plug of one part and the name of a socket from a second part. In this case, instead of a developer choosing an element from a list of sockets as in steps 508 or 708, the stored element is simply read from the file and identified as the chosen socket.

In step 709 the variable Current Path is reassigned to the previous value of the variable Current Path plus the element chosen by the developer. By way of example, FIG. 5 shows a situation in which the variable Current Path is set to "naming context, new_context". Next, in step 710 the interface for that recently chosen socket is retrieved. In addition, the variable Current Interface is updated to be set equal to this newly retrieved interface. Next, this recently retrieved interface must be processed as above in order to determine which sockets it provides. Accordingly, steps 704 and 706 will be repeated in order to determine these new sockets. Therefore, in step 712 a new column for the inspector is initialized and displayed in order to hold the new sockets that will be determined from the Current Interface. By way of example, FIG. 5 shows a situation in which a new third column 608 entitled "new_context" has been initialized and displayed. The column is entitled "new_context" because it will display all of the sockets for the "new_context" socket of "naming context" as shown in the second column.

From step 712 control loops back to step 704 in which the sockets for this Current Interface will be determined and the developer will be allowed to choose one of these sockets. By way of example, FIG. 5 shows a situation in which the interface for the object "new_context" has been filtered and its determined sockets have been displayed in the third column. Shown are the sockets "itself" and "new_context" of the object "new_context". Note that although these new sockets are displayed, the developer has elected not to choose one of these new sockets (as indicated by a lack of highlighting), and has remained with the highlighted socket "new_context" from the second column. Depending upon the nature of a socket and its interface, it is conceivable that this procedure may be repeated indefinitely. However, based upon a particular implementation of an interface, at some point in step 708 the developer will not choose another socket and control will move to step 714.

In step 714, because no new socket has been chosen from the third column, the socket that is currently highlighted will be named by the value of the Current Path. By way of example, the inspector 206 of FIG. 5 shows a situation in which the final value of Current Path is "naming context, new_context". If the developer had chosen the socket "itself" from the third column, then the final value of Current Path would be "naming context, new_context, itself". This socket may now be used by the developer to establish a connection to the previously selected plug of another part. By way of example, FIG. 5 shows a situation in which the chosen socket is "new_context" of part 658 "naming context" that is desired to be connected to the plug "accumulate" of part 650.

Step 714 checks whether the Current Interface for the chosen socket is the same as or is derived from the interface for the plug type. If not, then no connection can be formed from the given plug to the chosen socket, and in step 718 the connection is left incomplete, no socket is named and this procedure ends. However, if the Current Interface for the chosen socket is the same as the interface for the plug type or it is derived from the interface for the plug type, then in step 716 a connection may be completed. In this case, the matching socket is named by the Current Path and the procedure ends. By way of example, FIG. 5 shows a situation in which the named socket "new_context" of part "naming context" matches with the previously chosen plug "accumulate" of the part "accumulator". Thus, a connection is formed as indicated by the highlighted connection line 656 between the two parts.

The present invention as described above employs various process steps involving data stored in computer systems. These steps are those requiring physical manipulation of physical quantities. Usually, though not necessarily, these quantities take the form of electrical or magnetic signals capable of being stored, transferred, combined, compared, and otherwise manipulated. It is sometimes convenient, principally for reasons of common usage, to refer to these signals as bits, values, elements, variables, characters, data structures, or the like. It should be remembered, however, that all of these and similar terms are to be associated with the appropriate physical quantities and are merely convenient labels applied to these quantities.

Further, the manipulations performed are often referred to in terms such as identifying, running, or comparing. In any of the operations described herein that form part of the present invention these operations are machine operations. Useful machines for performing the operations of the present invention include general purpose digital computers or other similar devices. In all cases, there should be borne in mind the distinction between the method of operations in operating a computer and the method of computation itself. The present invention relates to method steps for operating a computer in processing electrical or other physical signals to generate other desired physical signals.

The present invention also relates to an apparatus for performing these operations. This apparatus may be specially constructed for the required purposes, or it may be a general purpose computer selectively activated or reconfigured by a computer program stored in the computer. The processes presented herein are not inherently related to any particular computer or other apparatus. In particular, various general purpose machines may be used with programs written in accordance with the teachings herein, or it may be more convenient to construct a more specialized apparatus to perform the required method steps. The required structure will appear from the description given above.

In addition, embodiments of the present invention further relate to computer readable media that include program instructions for performing various computer-implemented operations. The media and program instructions may be those specially designed and constructed for the purposes of the present invention, or they may be of the kind well known and available to those having skill in the computer software arts. Examples of computer-readable media include, but are not limited to, magnetic media such as hard disks, floppy disks, and magnetic tape; optical media such as CD-ROM disks; magneto-optical media such as floptical disks; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter.

Figure 10:
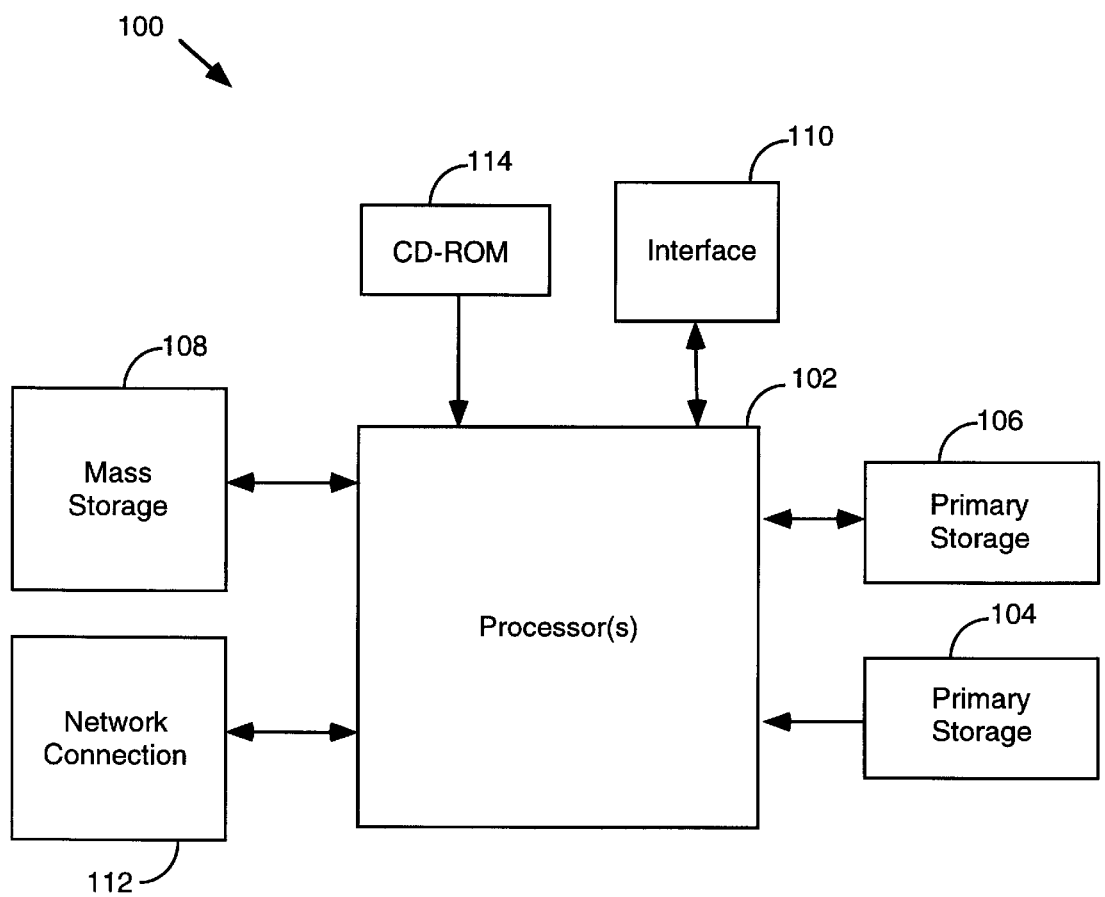
FIG. 10 shows a typical computer system suitable for implementing the present invention.

FIG. 10 illustrates a typical computer system in accordance with an embodiment of the present invention. The computer system 100 includes any number of processors 102 (also referred to as central processing units, or CPUs) that are coupled to storage devices including primary storage 106 (typically a random access memory, or RAM), primary storage 104 (typically a read only memory, or ROM). As is well known in the art, primary storage 104 acts to transfer data and instructions uni-directionally to the CPU and primary storage 106 is used typically to transfer data and instructions in a bi-directional manner. Both of these primary storage devices may include any suitable of the computer-readable media described above. A mass storage device 108 is also coupled bi-directionally to CPU 102 and provides additional data storage capacity and may include any of the computer-readable media described above. The mass storage device 108 may be used to store programs, data and the like and is typically a secondary storage medium such as a hard disk that is slower than primary storage. It will be appreciated that the information retained within the mass storage device 108, may, in appropriate cases, be incorporated in standard fashion as part of primary storage 106 as virtual memory. A specific mass storage device such as a CD-ROM 114 may also pass data uni-directionally to the CPU.

CPU 102 is also coupled to an interface 110 that includes one or more input/output devices such as such as video monitors, track balls, mice, keyboards, microphones, touch-sensitive displays, transducer card readers, magnetic or paper tape readers, tablets, styluses, voice or handwriting recognizers, or other well-known input devices such as, of course, other computers. Finally, CPU 102 optionally may be coupled to a computer or telecommunications network using a network connection as shown generally at 112. With such a network connection, it is contemplated that the CPU might receive information from the network, or might output information to the network in the course of performing the above-described method steps. The above-described devices and materials will be familiar to those of skill in the computer hardware and software arts.

Although the foregoing invention has been described in some detail for purposes of clarity of understanding, it will be apparent that certain changes and modifications may be practiced within the scope of the appended claims. For instance, it is contemplated that the present invention may be utilized in various fashions. In one aspect, the filtering of the Interface Definition Language (IDL) occurs as the developer is making a connection between parts within the composition builder. Once an implementation of an object has been constructed, however, it may be desirable to read this implementation back into the distributed object system. In a second aspect of the invention, the filtering of the IDL may occur as this implementation is being read back into the distributed object system. The invention may be practiced in other situations as well. Also, although the filtering technique of the present invention has been described within the specific context of the visual application builder, it is contemplated that the present invention may be practiced within any suitable application builder. Furthermore, although specific graphic interfaces have been described, the present invention may be practiced using any suitable graphic interface. Therefore, the described embodiments should be taken as illustrative and not restrictive, and the invention should not be limited to the details given herein but should be defined by the following claims and their full scope of equivalents.

We claim:

1. In a distributed object application builder apparatus having a graphical user interface in which parts having plugs and sockets are interconnected to define distributed object application programs, said parts corresponding to components and representing distributed objects, a computer-implemented method of determining the plugs of a first part using said graphical user interface, said method comprising the steps of:

identifying the first part by performing a selection action on the first part, said first part being represented by a graphical representation;

retrieving an interface for a first component that corresponds to the first part;

determining at least one attribute from the retrieved interface, each determined attribute having an associated attribute type;

determining at least one operation from the retrieved interface, each determined operation having an associated operation type;

retrieving a factory argument list from a factory method associated with said first component;

identifying at least one input argument from the retrieved factory argument list, each identified input argument having an associated input argument type; and indicating visually that said at least one attribute, said at least one operation and said at least one input argument are the determined plugs of the first part.

2. A method as recited in claim 1 further comprising the steps of:

identifying a second part;

choosing a socket associated with the second part;

determining whether the chosen socket of the second part is compatible with a determined plug of said first part; and indicating that the chosen socket of the second part is compatible with said determined plug of the first part when the chosen socket of the second part is determined to be compatible with said determined plug of said first part.

3. A method as recited in claim 2 wherein determining whether the chosen socket of the second part is compatible with a determined plug is performed by determining whether the plug type of a determined plug is one of the following: a CORBA object, the type of the chosen socket or the type of a class from which the chosen socket inherits.

4. A method as recited in claim 2 wherein said second part is represented by a graphical representation, wherein said step of identifying the second part includes performing a selection action on said second part and wherein said step of indicating that the chosen socket of the second part is compatible is performed visually.

5. A method as recited in claim 1 wherein the attribute type of each attribute and the operation type of each operation and the input argument type of each input argument are object types.

6. A method as recited in claim 1 wherein determining at least one attribute from the retrieved interface includes determining all attributes of the retrieved interface and determining at least one operation from the retrieved interface includes determining all of the operations from the retrieved interface that require one operation argument.

7. In a distributed object application builder apparatus having a graphical user interface in which parts having plugs and sockets are interconnected to define distributed object application programs, said parts corresponding to components and representing distributed objects, a computer-implemented method of determining the sockets of a first part using said graphical user interface said method comprising the steps of:

identifying the first part by performing a selection action on the first part, said first part being represented by a graphical representation;

retrieving an interface for a first component that corresponds to the first part;

determining each attribute from the retrieved interface, each determined attribute having an associated attribute type;

determining each operation from the retrieved interface that returns an operation result, each determined operation having an associated operation result type; and indicating visually that said determined attributes and said determined operations are the determined sockets of the first part.

8. A method as recited in claim 7 further comprising the steps of:

identifying a second part;

choosing a plug associated with the second part;

determining whether the chosen plug of the second part is compatible with a determined socket of said first part; and indicating that the chosen plug of the second part is compatible with said determined socket of the first part when the chosen plug of the second part is determined to be compatible with said determined socket of said first part.

9. A method as recited in claim 8 wherein determining whether the chosen plug of the second part is compatible with a determined socket is performed by determining whether the socket type of a determined socket is one of the following: the type of the chosen plug or the type of a class from which the chosen plug inherits.

10. A method as recited in claim 8 wherein said second part is represented by a graphical representation, wherein said step of identifying the second part includes performing a selection action on said second part and wherein said step of indicating that the chosen plug of the second part is compatible is performed visually.

11. A method as recited in claim 7 wherein the attribute type of each attribute and the operation result type of each operation result are object types.

12. A method as recited in claim 7 wherein the step of determining each attribute from the retrieved interface includes determining all attributes of the retrieved interface and the step of determining each operation from the retrieved interface includes determining all of the operations from the retrieved interface that return an operation result.

13. A method as recited in claim 7 further comprising the steps of:

choosing one of the indicated determined sockets of the first part;

retrieving a chosen interface for a chosen component that corresponds to the chosen socket;

determining each attribute from the chosen interface having an associated attribute type;

determining each operation from the chosen interface that returns an operation result having an associated operation result type, together the determined attributes and the determined operation results constituting the sockets of the chosen socket; and indicating the determined sockets of the chosen socket.

14. A method as recited in claim 13 wherein the sockets are determined in a recursive manner and are displayed visually in a hierarchical order.

15. In a distributed object application builder apparatus in which parts having plugs and sockets are interconnected to define distributed object application programs, said parts corresponding to components and representing distributed objects, said components being located in a component catalog, a computer-implemented method of creating a distributed object application program comprising the steps of:

choosing a first component from said component catalog;

creating a first part corresponding to said first component;

retrieving a first interface for said first component that corresponds to said first part;

filtering said first interface in order to produce a list of plugs and sockets for said first part;

choosing a second component from said component catalog;

creating a second part corresponding to said second component;

retrieving a second interface for said second component that corresponds to said second part;

filtering said second interface in order to produce a list of plugs and sockets for said second part; and connecting a first plug from said first part to a first socket of said second part to form a connection in order to at least partially define said distributed object application program, whereby when said distributed object application program is executing said second part is arranged to pass information to said first part through said connection.

16. A method as recited in claim 15 wherein said distributed object application builder apparatus has a graphical user interface and said steps of choosing a first component and connecting a first plug are performed in said graphical user interface by selection gestures.

17. A method as recited in claim 15 wherein said distributed object application builder apparatus includes a code generator unit, and said method further comprises the step of delivering said distributed object application program defined in said distributed object application builder apparatus to said code generator unit such that source code for said distributed object application program is produced.

18. A computer program product comprising a computer-usable medium having computer-readable program code embodied thereon for determining the plugs of a first part using a graphical user interface of a distributed object application builder apparatus in which parts having plugs and sockets are interconnected to define distributed object application programs, said parts corresponding to components and representing distributed objects, the computer program product comprising computer-readable program code for effecting the following steps within a computer system:

identifying the first part by performing a selection action on the first part, said first part being represented by a graphical representation;

retrieving an interface for a first component that corresponds to the first part;

determining at least one attribute from the retrieved interface, each determined attribute having an associated attribute type;

determining at least one operation from the retrieved interface, each determined operation having an associated operation type;

retrieving a factory argument list from a factory method associated with said first component;

identifying at least one input argument from the retrieved factory argument list, each identified input argument having an associated input argument type; and indicating visually that said at least one attribute, said at least one operation and said at least one input argument are the determined plugs of the first part.

19. A computer program product as recited in claim 18 further comprising program code for:

identifying a second part;

choosing a socket associated with the second part;

determining whether the chosen socket of the second part is compatible with a determined plug of said first part; and indicating that the chosen socket of the second part is compatible with said determined plug of the first part when the chosen socket of the second part is determined to be compatible with said determined plug of said first part.

20. A computer program product as recited in claim 19 wherein the program code for determining whether the chosen socket of the second part is compatible with a determined plug includes program code for determining whether the plug type of a determined plug is one of the following: a CORBA object, the type of the chosen socket or the type of a class from which the chosen socket inherits.

21. A computer program product as recited in claim 19 wherein said second part is represented by a graphical representation, wherein said program code for identifying the second part includes program code for performing a selection action on said second part and wherein said program code for indicating that the chosen socket of the second part is compatible is arranged to function visually.

22. A computer program product as recited in claim 18 wherein the attribute type of each attribute and the operation type of each operation and the input argument type of each input argument are object types.

23. A computer program product as recited in claim 18 wherein the program code for determining each attribute from the retrieved interface includes program code for determining all attributes of the retrieved interface and the program code for determining each operation from the retrieved interface includes program code for determining all of the operations from the retrieved interface that require one operation argument.

24. A computer program product comprising a computer-usable medium having computer-readable program code embodied thereon for determining the sockets of a first part using a graphical user interface of a distributed object application builder apparatus in which parts having plugs and sockets are interconnected to define distributed object application programs, said parts corresponding to components and representing distributed objects, the computer program product comprising computer-readable program code for effecting the following steps within a computer system:

identifying the first part;

retrieving an interface for a first component that corresponds to the first part;

determining each attribute from the retrieved interface, each determined attribute having an associated attribute type;

determining each operation from the retrieved interface that returns an operation result, each determined operation having an associated operation result type; and indicating said determined attributes and said determined operations as being the determined sockets of the first part.

25. A computer program product as recited in claim 24 further comprising program code for effecting the following steps:

identifying a second part;

choosing a plug associated with the second part;

determining whether the chosen plug of the second part is compatible with a determined socket of said first part; and indicating that the chosen plug of the second part is compatible with said determined socket of the first part when the chosen plug of the second part is determined to be compatible with said determined socket of said first part.

26. A computer program product as recited in claim 25 wherein determining whether the chosen plug of the second part is compatible with a determined socket is performed by determining whether the socket type of a determined socket is one of the following: the type of the chosen plug or the type of a class from which the chosen plug inherits.

27. A computer program product as recited in claim 25 wherein said second part is represented by a graphical representation, wherein said program code for identifying the second part includes program code for performing a selection action on said second part and wherein said program code for indicating that the chosen plug of the second part is compatible is arranged to function visually.

28. A computer program product as recited in claim 24 wherein the attribute type of each attribute and the operation result type of each operation result are object types.

29. A computer program product as recited in claim 24 wherein the step of determining each attribute from the retrieved interface includes determining all attributes of the retrieved interface and the step of determining each operation from the retrieved interface includes determining all of the operations from the retrieved interface that return an operation result.

30. A computer program product as recited in claim 24 further comprising program code for effecting the steps of:

choosing one of the indicated determined sockets of the first part;

retrieving a chosen interface for a chosen component that corresponds to the chosen socket;

determining each attribute from the chosen interface having an associated attribute type;

determining each operation from the chosen interface that returns an operation result having an associated operation result type, together the determined attributes and the determined operation results constituting the sockets of the chosen socket; and indicating the determined sockets of the chosen socket.

31. A computer program product as recited in claim 30 wherein the sockets are determined in a recursive manner and are displayed visually in a hierarchical order.

32. A computer program product comprising a computer-usable medium having computer-readable program code embodied thereon for creating a distributed object application program in a distributed object application builder apparatus in which parts having plugs and sockets are interconnected to define distributed object application programs, said parts corresponding to components and representing distributed objects, said components being located in a component catalog, the computer program product comprising computer-readable program code for effecting the following steps within a computer system:

choosing a first component from said component catalog;

creating a first part corresponding to said first component;

retrieving a first interface for said first component that corresponds to said first part;

filtering said first interface in order to produce a list of plugs and sockets for said first part;

choosing a second component from said component catalog;

creating a second part corresponding to said second component;

retrieving a second interface for said second component that corresponds to said second part;

filtering said second interface in order to produce a list of plugs and sockets for said second part; and connecting a first plug from said first part to a first socket of said second part to form a connection in order to at least partially define said distributed object application program, whereby when said distributed object application program is executing said second part is arranged to pass information to said first part through said connection.

33. A computer program product as recited in claim 32 wherein said distributed object application builder apparatus has a graphical user interface and said steps of choosing a first component and connecting a first plug are performed in said graphical user interface by selection gestures.

34. A computer program product as recited in claim 32 wherein said distributed object application builder apparatus includes a code generator unit, and said computer program product further comprises program code for delivering said distributed object application program defined in said distributed object application builder apparatus to said code generator unit such that source code for said distributed object application program is produced.

35. A computer apparatus for use in visually determining the sockets of a first part in a distributed object application builder apparatus in which parts having plugs and sockets are interconnected to define distributed object application programs, said parts corresponding to components and rep resenting distributed objects, the computer apparatus comprising:

a graphical user interface;

a processing unit;

an input/output device coupled to the processing unit;

a storage device in communication with the processing unit, the storage device including, program code for identifying the first part by performing a selection action on the first part, said first pa being represented by a graphical representation, program code for retrieving an interface for a first component that corresponds to the first part, program code for determining each attribute from the retrieved interface, each determined attribute having an associated attribute type;

program code for determining each operation from the retrieved interface that returns an operation result, each determined operation having an associated operation result type, and program code for indicating visually that said determined attributes and said determined operations are the determined sockets of the first part.

* * * * *

UNITED STATES PATENT AND TRADEMARK OFFICE
CERTIFICATE OF CORRECTION

PATENT NO. : 5,949,998
DATED : September 7, 1999
INVENTOR(S) : Brad G. Fowlow, Gregory B. Nuyens and Hans E. Muller It is certified that error appears in the above-identified patent and that said Letters Patent are hereby corrected as shown below:

In line 14 of Claim 35 (Column 25, line 9), change "pa" to --part--.

Signed and Sealed this

Seventeenth Day of April, 2001

Attest:

NICHOLAS P. GODICI

*Attesting Officer*  *Acting Director of the United States Patent and Trademark Office*